United States Patent [19]
Fujii et al.

[11] Patent Number: 5,987,973
[45] Date of Patent: Nov. 23, 1999

[54] ROTATION DETECTING DEVICE OF AN ENGINE

[75] Inventors: Noriaki Fujii; Mamoru Kosuge; Taketoshi Satoh, all of Saitama, Japan

[73] Assignee: Honda Giken Kogyo Kabushiki Kaisha, Tokyo, Japan

[21] Appl. No.: 08/893,321

[22] Filed: Jul. 16, 1997

Related U.S. Application Data

[63] Continuation-in-part of application No. 08/838,081, Apr. 15, 1997.

[30] Foreign Application Priority Data

Jul. 24, 1996 [JP] Japan .................................. 8-194917

[51] Int. Cl.$^6$ .................................................. G01M 15/00
[52] U.S. Cl. ............................................. 73/116; 123/617
[58] Field of Search .................................. 73/116, 117.3, 73/119 R; 123/90.16, 90.17, 612, 617, 414

[56] References Cited

U.S. PATENT DOCUMENTS

| | | | |
|---|---|---|---|
| 5,182,943 | 2/1993 | Fukui et al. ................................ | 73/116 |
| 5,293,776 | 3/1994 | Takegami et al. .................... | 73/119 R |
| 5,333,577 | 8/1994 | Shinojima ............................. | 123/90.17 |
| 5,463,898 | 11/1995 | Blander et al. ............................ | 73/116 |
| 5,497,737 | 3/1996 | Nakamura ............................. | 123/90.16 |
| 5,623,897 | 4/1997 | Hampton et al. ..................... | 123/90.16 |
| 5,627,464 | 5/1997 | Shinjo et al. ............................ | 123/617 |
| 5,769,044 | 6/1998 | Moriya ................................. | 123/90.17 |

FOREIGN PATENT DOCUMENTS 62-96860  6/1987  Japan .
62-26566  8/1987  Japan .

*Primary Examiner*—Eric S. McCall
*Attorney, Agent, or Firm*—Carrier, Blackman & Associates, P.C.; Joseph P. Carrier; William D. Blackman

[57] ABSTRACT

On the upper portion of a cylinder head 1 of an engine mounted on a vehicle body in such a way that a crankshaft faces in the lateral direction of the body, a head cover 36 is supported in a floating state through an elastic member 14 and a rubber bush 52. A pair of TDC sensors 37$i$ and 37$e$ for detecting the rotational positions of engine camshafts 6$i$ and 6$e$, are attached from the outside to the front surface and to the rear portion of the upper surface of the head cover 36 with bolts 38 respectively in such a way as not to interfere with a bonnet 39 of the body descending forward. Consequently, while ensuring the maintainability of the TDC sensors 37$i$ and 37$e$ of the engine, the TDC sensors 37$i$ and 37$e$ can compactly be attached to the engine.

20 Claims, 11 Drawing Sheets

ROTATION DETECTING DEVICE OF AN ENGINE

This application is a Continuation-In-Part of Copending Application U.S. Ser. No. 08/838,081 filed Apr. 15, 1997 and entitled "Engine-Rotation Detecting System".

BACKGROUND OF THE INVENTION

1. Field of the Invention

The present invention relates to a rotation detecting device of an engine, which comprises a portion to be detected located on a rotary shaft of the engine, and a sensor for detecting the position of the portion to be detected.

2. Description of Relevant Art

A detecting device for detecting a crank angle of an engine is well known in Japanese Patent Application Laid-open No. 62-96860, wherein a portion to be detected is located on a camshaft interlocked with a crankshaft to rotate, and a sensor located on a cylinder head faces the portion to be detected.

The above conventional device has various problems associated therewith. For example, the sensor was covered by a cover member (belt cover) mounted on the cylinder head, whereby a job of maintaining the sensor was troublesome because the cover member had to be removed. Further, the operating performance became worse because the sensor was attached to the cylinder head under the camshaft.

SUMMARY OF THE INVENTION

The present invention is made to overcome the above-mentioned problems of the known detecting device, and an object is to improve maintainability of a sensor of a rotation detecting device of an engine.

To achieve the above object, according to a first feature of the present invention, a rotation detecting device of an engine is proposed, which comprises a portion to be detected located on a rotary shaft of the engine, and a sensor for detecting the position of the portion to be detected, and in which said sensor is directly attached to a cover member located above a cylinder head from the outside thereof.

According to such first feature, the sensor becomes readily accessible for a worker to improve the maintainability thereof, and the sensor alone can be removed from the cover member without removing the cover member from the engine, for also improving the maintainability of the sensor. Furthermore, the sensor is directly attached without using a bracket or the like, so that the number of parts and the cost are reduced and a possibility of error of the installation position is also reduced.

Furthermore, according to a second feature of the present invention there is proposed, a rotation detecting device of an engine mounted on a body and having a camshaft, a crankshaft, a cylinder head, a head cover, and intake and exhaust manifolds, the rotation detecting device comprises a portion to be detected located on the camshaft, and a sensor for detecting the position of the portion to be detected, and wherein a bonnet of the body inclined in such a way that a front side of the bonnet is lower than a rear side thereof, the engine is arranged under the bonnet such the crankshaft faces in the lateral direction of the body, the intake manifold is connected to a front surface of the cylinder head and the exhaust manifold is connected to a rear surface of the cylinder head, and said sensor is attached from the outside to a front surface of the head cover covering said cylinder head from above.

According to the above second feature, again, the sensor becomes accessible for a worker to improve the maintainability thereof, while the sensor alone can be removed without removing the head cover from the engine for also improving the maintainability of the sensor. Furthermore, the sensor does not easily interfere with the bonnet, so that the position of the bonnet can be lowered. Moreover, even if the sensor is attached to the front surface of the head cover adjacent to the hot cylinder head, the thermal effect given to the sensor can be somewhat decreased because an intake manifold whose temperature is lower than the temperature of the exhaust manifold is located at the front surface of the cylinder head, and because the cooling effect on the sensor due to the wind or air flow caused by traveling movement of the body is increased given that the sensor is attached to the front surface of the head cover.

Still further, according to a third feature of the present invention there is proposed, a rotation detecting device of an engine mounted on a body and having a camshaft, a crankshaft, a cylinder head, a head cover, and intake and exhaust manifolds, the rotation detecting device comprises a portion to be detected located on the camshaft, and a sensor for detecting the position of the portion to be detected, and wherein a bonnet of the body is arranged in such a way that a front side of the bonnet is lower than a rear side thereof, the engine is arranged under the bonnet such that the crankshaft faces in the back and forth direction of the body, and said sensor is attached from the outside to the rear portion of the head cover covering the cylinder head from above.

According to the above third feature, again, the sensor becomes accessible for a worker to improve the maintainability thereof, and the sensor alone can be removed without removing the head cover from the engine also improving the maintainability of the sensor. Furthermore, the sensor does not easily interfere with the bonnet, so that the position of the bonnet, again, can be lowered.

Furthermore, according to a fourth feature of the present invention there is proposed, a rotation detecting device of an engine having a camshaft, a cylinder head and a head cover covering the cylinder head from above, the device comprises a portion to be detected located on the camshaft, and a sensor for detecting the position of the portion to be detected, and wherein a connecting surface between the cylinder head and the head cover is located at a position lower than said camshaft, and said sensor is attached from the outside to a portion, beside the camshaft, of said head cover.

According to the fourth feature, again, the sensor becomes accessible for a worker to improve the maintainability thereof, and the sensor alone can be removed without removing the head cover from the engine thereby also improving the maintainability of the sensor. Furthermore, while an attaching position of the sensor can easily be ensured on the head cover, the attaching structure can also be made simple.

The above and other objects, features, and advantages of the present invention will be made clear by the description of the preferred embodiments given below in detail in conjunction with the accompanying drawings.

BRIEF DESCRIPTION OF THE DRAWINGS

FIGS. 1 to 9 show a first embodiment of the present invention, in which:

FIGS. 10 and 11 show a second embodiment of the present invention, in which:

DETAILED DESCRIPTION OF THE PREFERRED EMBODIMENTS

The description of the first preferred embodiment of the present invention will now be given below with reference to FIGS. 1 to 9.

Figure 1:
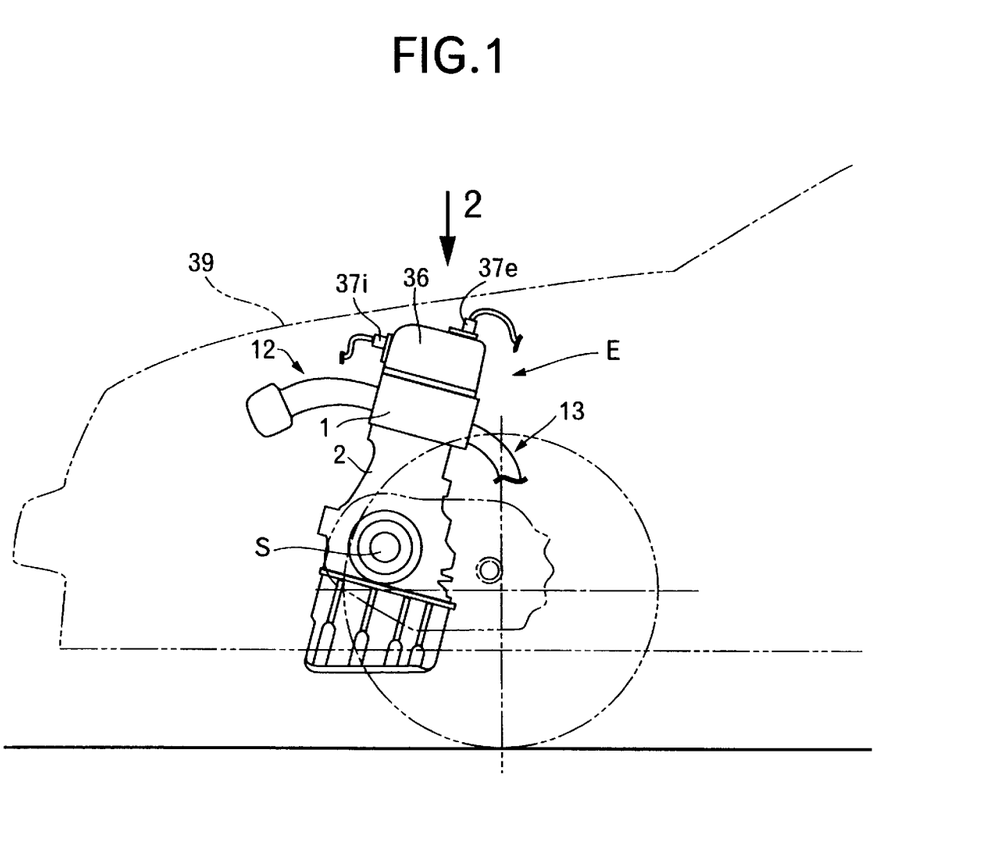
FIG. 1 is a side view of a front portion of a body of a vehicle.
Figure 2:
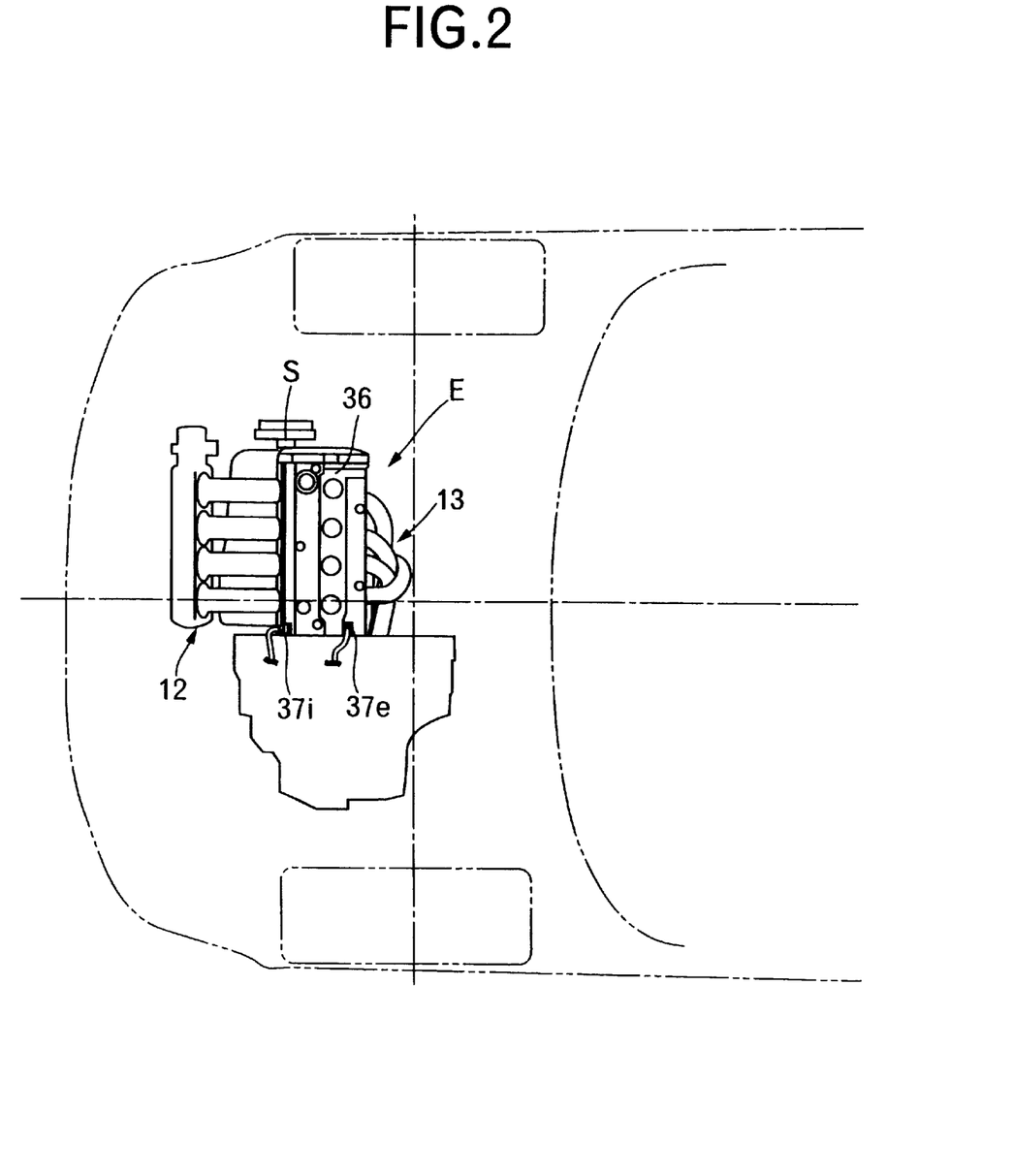
FIG. 2 is a plan view seen in the direction 2 shown by the arrow of FIG. 1.

As shown in FIGS. 1 and 2, a straight 4-cylinder engine E mounted on a front portion of a body of a front-engine, front-drive vehicle is arranged such that a crankshaft S faces in the lateral direction of the body, and that a cylinder head 1 and a cylinder block 2 are inclined backward. To a front surface and a rear surface of the cylinder head 1, an intake manifold 12 and an exhaust manifold 13 are connected respectively.

Figure 3:
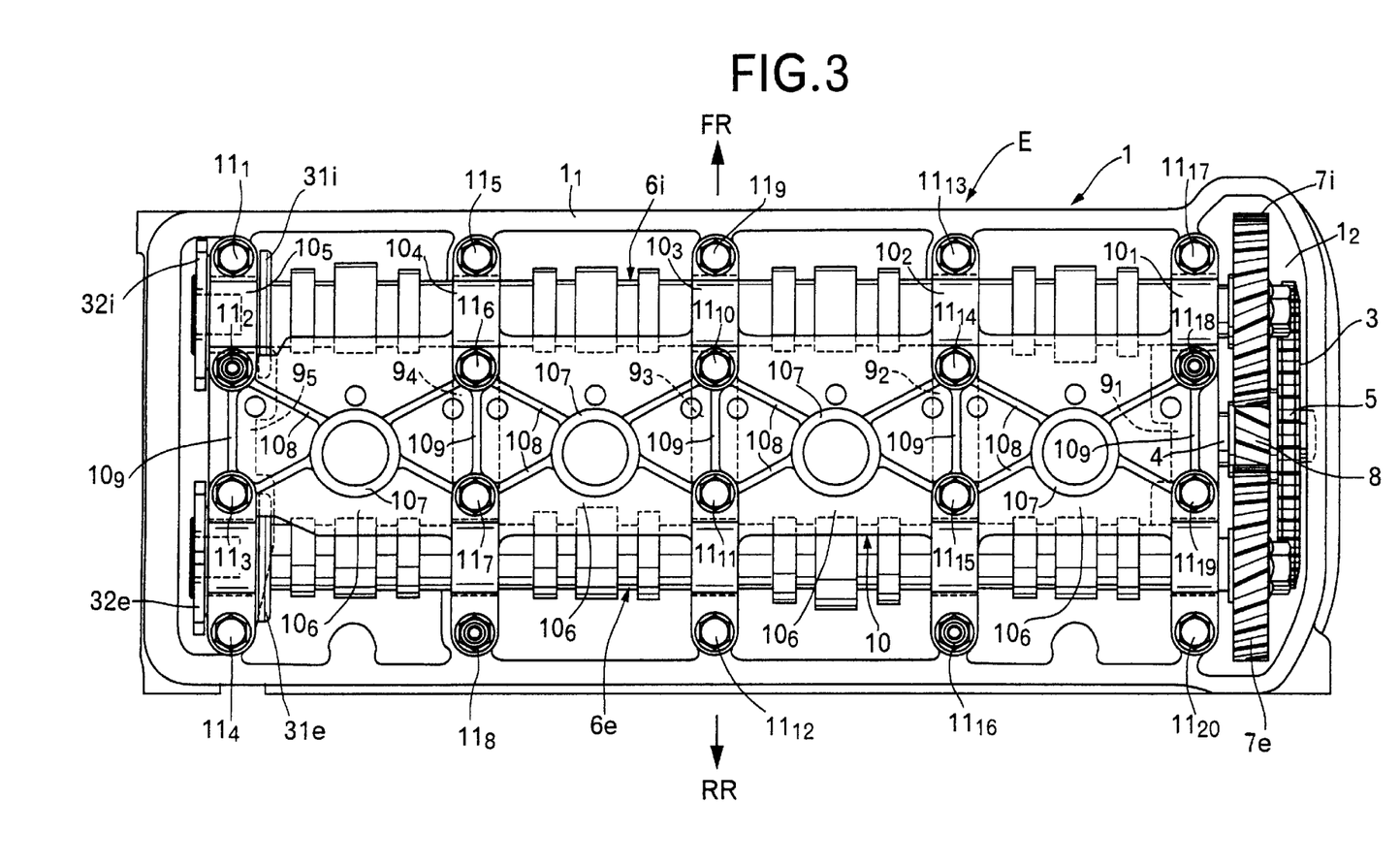
FIG. 3 is a plan view showing a cylinder head without a head cover of a straight 4-cylinder engine.

FIG. 3 is a plan view showing the engine E in a state where a head cover 36 is removed, and the side of the arrow FR is the front side (intake side) and the side of the arrow RR is the rear side (exhaust side) in a condition where the engine E is mounted on the body. Around the upper surface of the cylinder head 1 to which the lower surface of the head cover is connected, a head cover connecting surface $1_1$ is formed, and in a timing chain chamber $1_2$ formed in one side (right side of the body) thereof in such a way as to penetrate it vertically, a timing chain 3 is contained, which transmits the rotation of the crankshaft S to a valve-operating mechanism. A chain sprocket 5 is supported by an intermediate shaft 4 arranged in the cylinder head 1 in such a way as to thrust into the timing chain chamber $1_2$, and the upper end of said timing chain 3 is engaged with the chain sprocket 5.

An intake camshaft 6i and an exhaust camshaft 6e are supported in parallel by the cylinder head 1, and driven helical gears 7i and 7e located at the right ends thereof are engaged with driving helical gear 8 supported by said intermediate shaft 4. Accordingly, the rotation of the crankshaft S is transmitted to the intake camshaft 6i and the exhaust camshaft 6e through the timing chain 3, the driving helical gear 8, and the driven helical gears 7i and 7e, in order to drive both the camshafts 6i and 6e at a ½ rotation speed of the crankshaft S.

On the upper surface of the cylinder head 1, five lower camshaft holders $9_1$ to $9_5$ (#1 to #5) are arranged in a row from the right side of the body to the left side. By screwing a total of twenty bolts $11_1$ to $11_{20}$ penetrating an integrally formed upper camshaft holder assembly 10 and the five lower camshaft holders $9_1$ to $9_5$ into the upper surface of the cylinder head 1, the intake camshaft 6i and the exhaust camshaft 6e are freely rotatably supported between the lower camshaft holders $9_1$ to $9_5$ and the upper camshaft holder assembly 10 which are fastened together to the cylinder head 1.

The upper camshaft holder assembly 10 comprises five upper camshaft holders $10_1$ to $10_5$ to be connected to the upper surfaces of the five lower camshaft holders $9_1$ to $9_5$, and four connecting portions $10_6$ integrally connecting the five upper camshaft holders $10_1$ to $10_5$. On the upper surface of each of the connecting portions $10_6$, an ignition plug guide $10_7$ for installing and removing an ignition plug (not shown in the figure) and reinforcing ribs $10_8$ and $10_8$ formed to cross like an X, are formed. Said X-like reinforcing ribs $10_8$ and $10_8$ connect the fastening portions of ten bolts $11_2$, $11_3$, $11_6$, $11_7$, $11_{10}$, $11_{11}$, $11_{14}$, $11_{15}$, $11_{18}$, $11_{19}$ located inside the camshafts 6i and 6e among said twenty bolts $11_1$ to $11_{20}$ and the ignition plug guides $10_7$, so that while ensuring the space for installing and removing the ignition plugs, the rigidity of the connecting portions $10_6$ can largely be improved.

Furthermore, on the upper surface of each of the upper camshaft holders $10_1$ to $10_5$, a reinforcing rib $10_9$ is formed, which extends in the direction at right angles to the axes of the intake camshaft 6i and the exhaust camshaft 6e. The support rigidity of the camshafts 6i and 6e is largely improved by the reinforcing ribs $10_8$ and $10_8$, and the reinforcing rib $10_9$.

Figure 4:
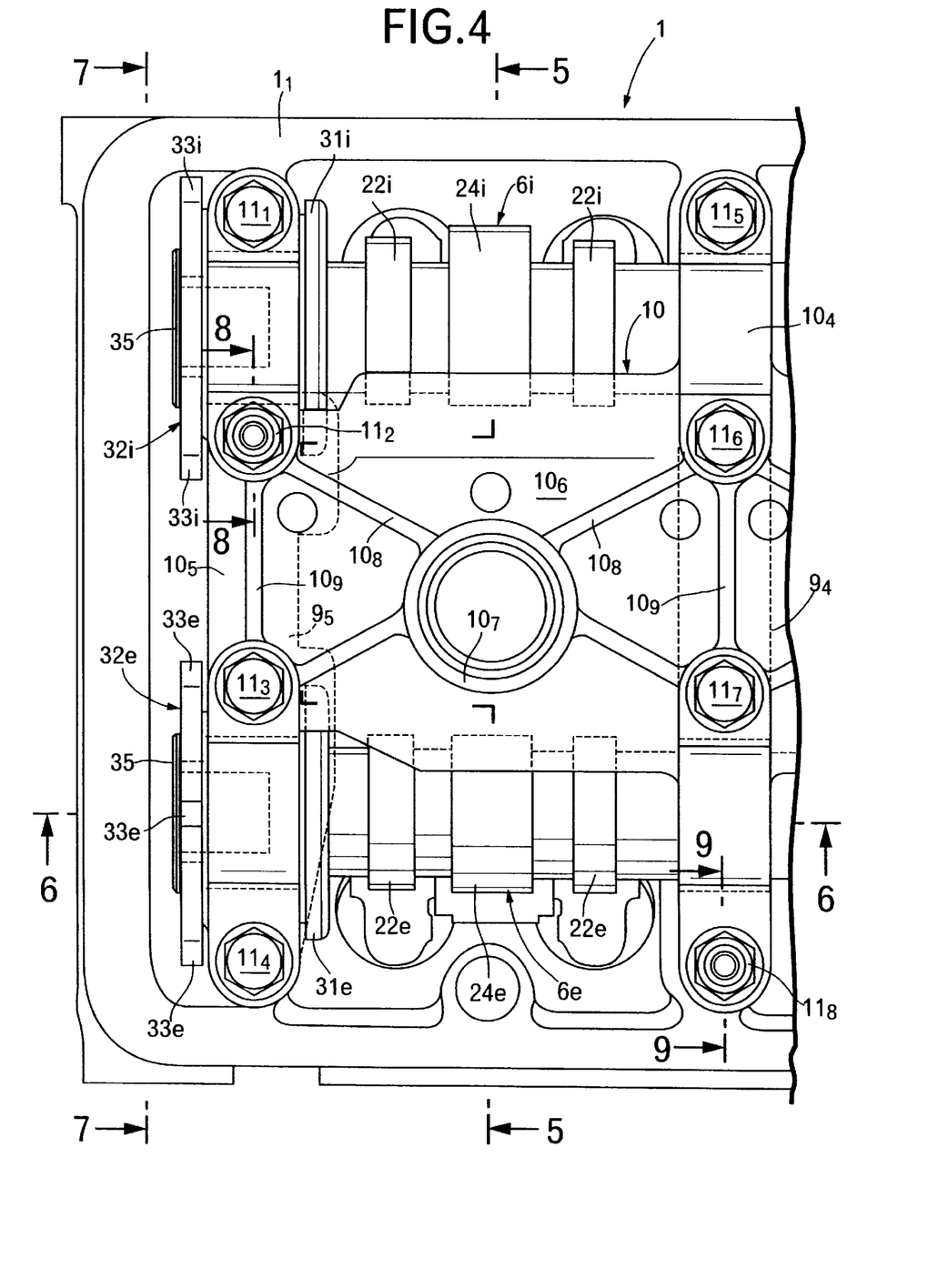
FIG. 4 is an enlarged view of a main, left side portion of FIG. 3.
Figure 5:
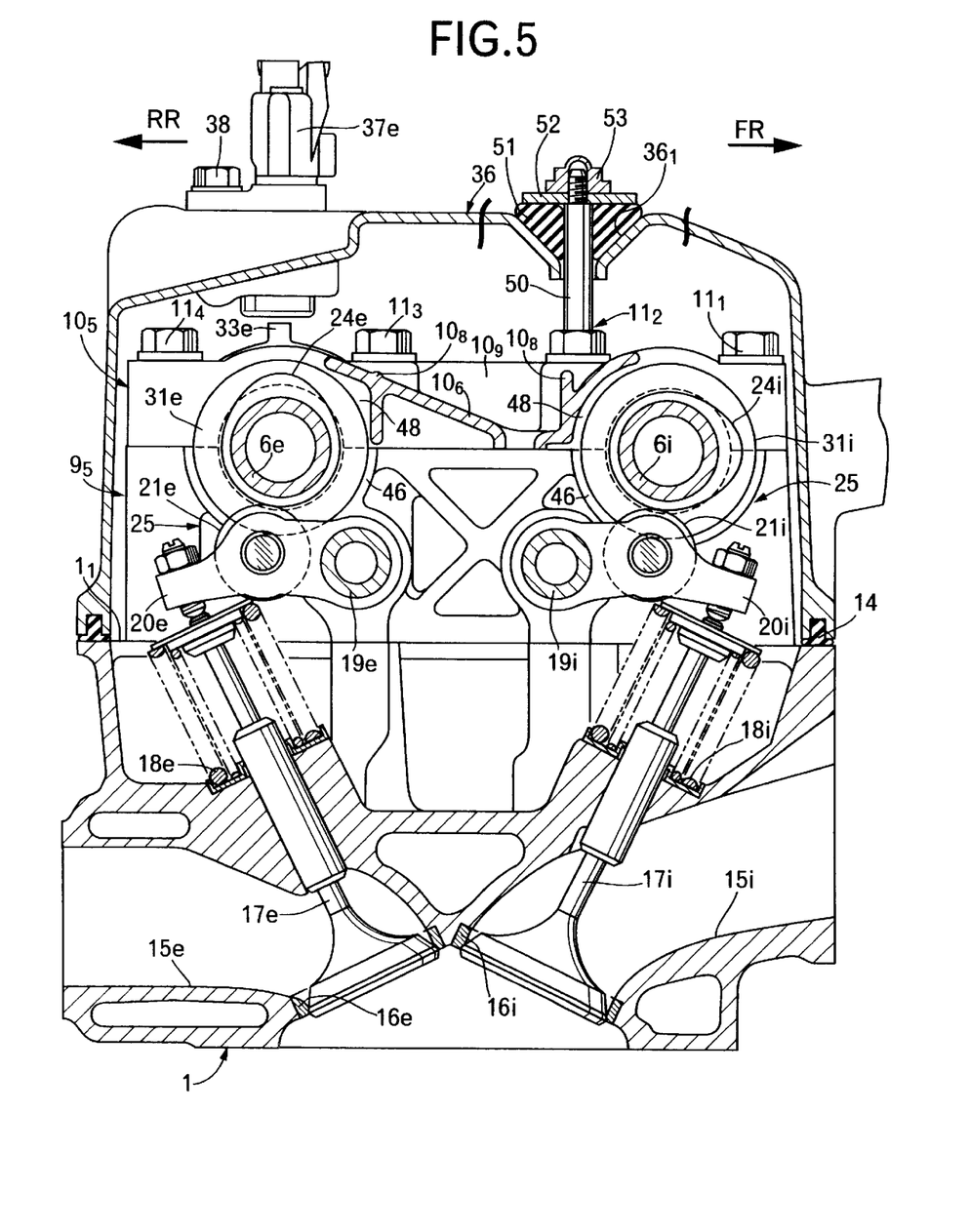
FIG. 5 is a sectional view taken along the line 5—5 of FIG. 4.
Figure 6:
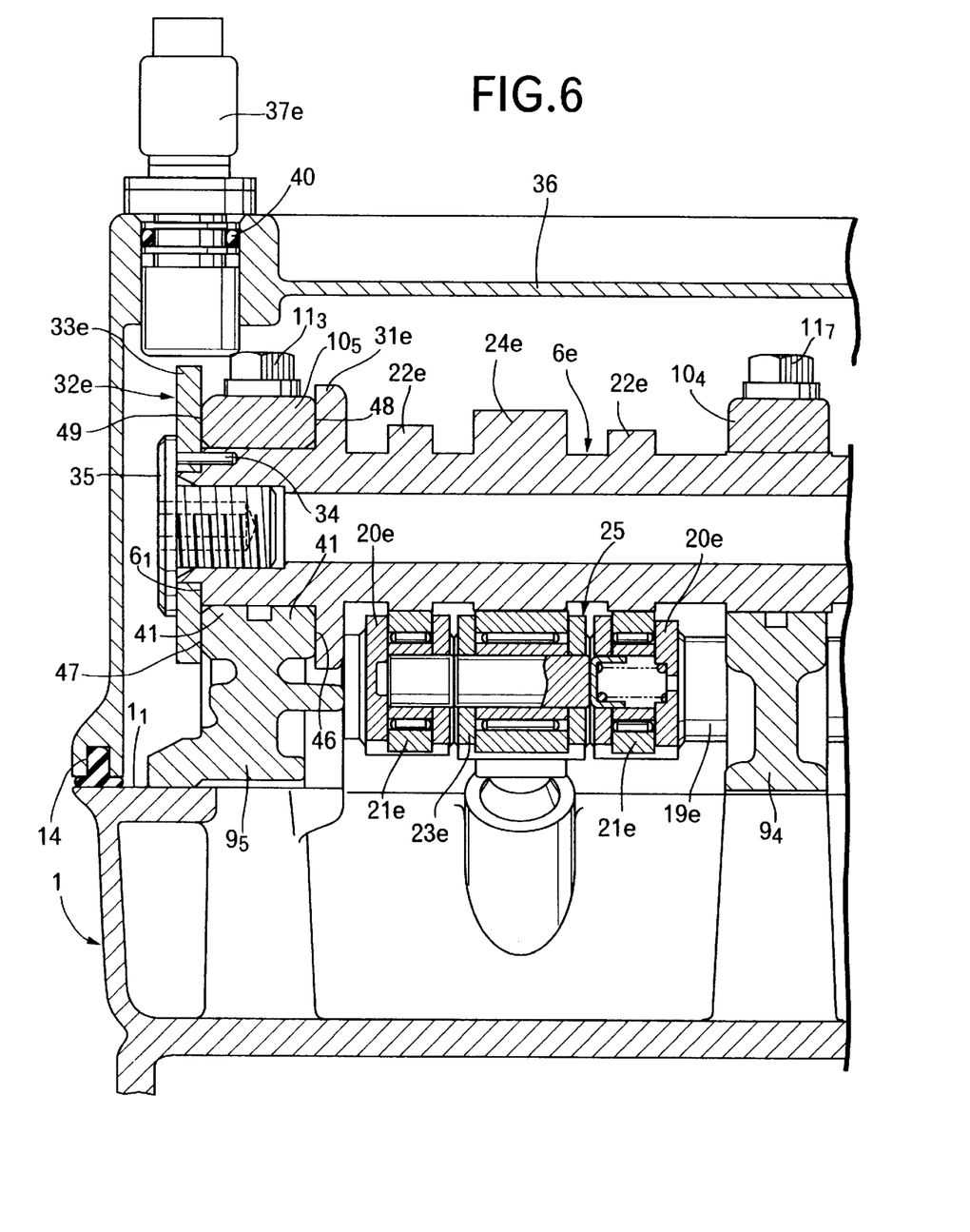
FIG. 6 is a sectional view taken along the line 6—6 of FIG. 4.

It is clear by referring to FIGS. 4 to 6 collectively that to the cylinder head 1, an intake port 15i and an exhaust port 15e are formed corresponding to each of the cylinders, and valve holes 16i, 16i and 16e, 16e connected to the intake port 15i and the exhaust port 15e are opened and closed by a pair of intake valves 17i and 17i and a pair of exhaust valves 17e and 17e. The intake valves 17i and 17i and the exhaust valves 17e and 17e are urged in the valve closing directions by valve springs 18i, 18i and 18e, 18e respectively.

An intake rocker shaft 19i and an exhaust rocker shaft 19e are supported by the five lower camshaft holders $9_1$ to $9_5$. While a pair of intake rocker arms 20i and 20i whose first ends are rotatably supported by the intake rocker shaft 19i, bring the second ends thereof into contact with stem ends of the intake valves 17i and 17i, and a pair of exhaust rocker arms 20e and 20e whose first ends are rotatably supported by the exhaust rocker shaft 19e, bring the second ends thereof into contact with stem ends of the exhaust valves 17e and 17e. Then, while rollers 21i and 21i located in the mid position of the low speed intake rocker arms 20i and 20i come into contact with low speed cams 22i and 22i located on the intake camshaft 6i, rollers 21e and 21e located in the mid position of the low speed exhaust rocker arms 20e and 20e come into contact with low speed cams 22e and 22e located on the exhaust camshaft 6e.

FIG. 6 shows a valve-operating mechanism on the exhaust side including the exhaust rocker shaft 19e. It is clear from said figure that a high speed exhaust rocker arm 23e is rotatably supported by the exhaust rocker shaft 19e in such a way as to be put between said pair of low speed exhaust rocker arms 20e and 20e, and the high speed exhaust rocker arm 23e comes into contact with a high speed cam 24e located on the exhaust camshaft 6e. The high speed exhaust rocker arm 23e and the low speed exhaust rocker arms 20e and 20e can mutually be connected and disconnected by a variable valve timing/lift mechanism 25. The structure of the variable valve timing/lift mechanism 25 is well known, so it is not described in detail here. Moreover, the structure of a valve-operating mechanism on the intake side is also the same as the structure of the previously described valve-operating mechanism on the exhaust side substantially.

When the engine E operates at a high speed, the high speed rocker arms 23$i$ and 23$e$ are connected to the low speed rocker arms 20$i$, 20$i$ and 20$e$, 20$e$ by the variable valve timing/lift mechanism 25, and the intake valves 17$i$ and 17$i$ and the exhaust valves 17$e$ and 17$e$ are driven by the profiles of the high speed cams 24$i$ and 24$e$. Furthermore, when the engine E operates at a low speed, the high speed rocker arms 23$i$ and 23$e$ are separated from the low speed rocker arms 20$i$, 20$i$ and 20$e$, 20$e$ by the variable valve timing/lift mechanism 25, and the intake valves 17$i$ and 17$i$ and the exhaust valves 17$e$ and 17$e$ are driven by the profiles of the low speed cams 22$i$, 22$i$ and 22$e$, 22$e$.

Figure 7:
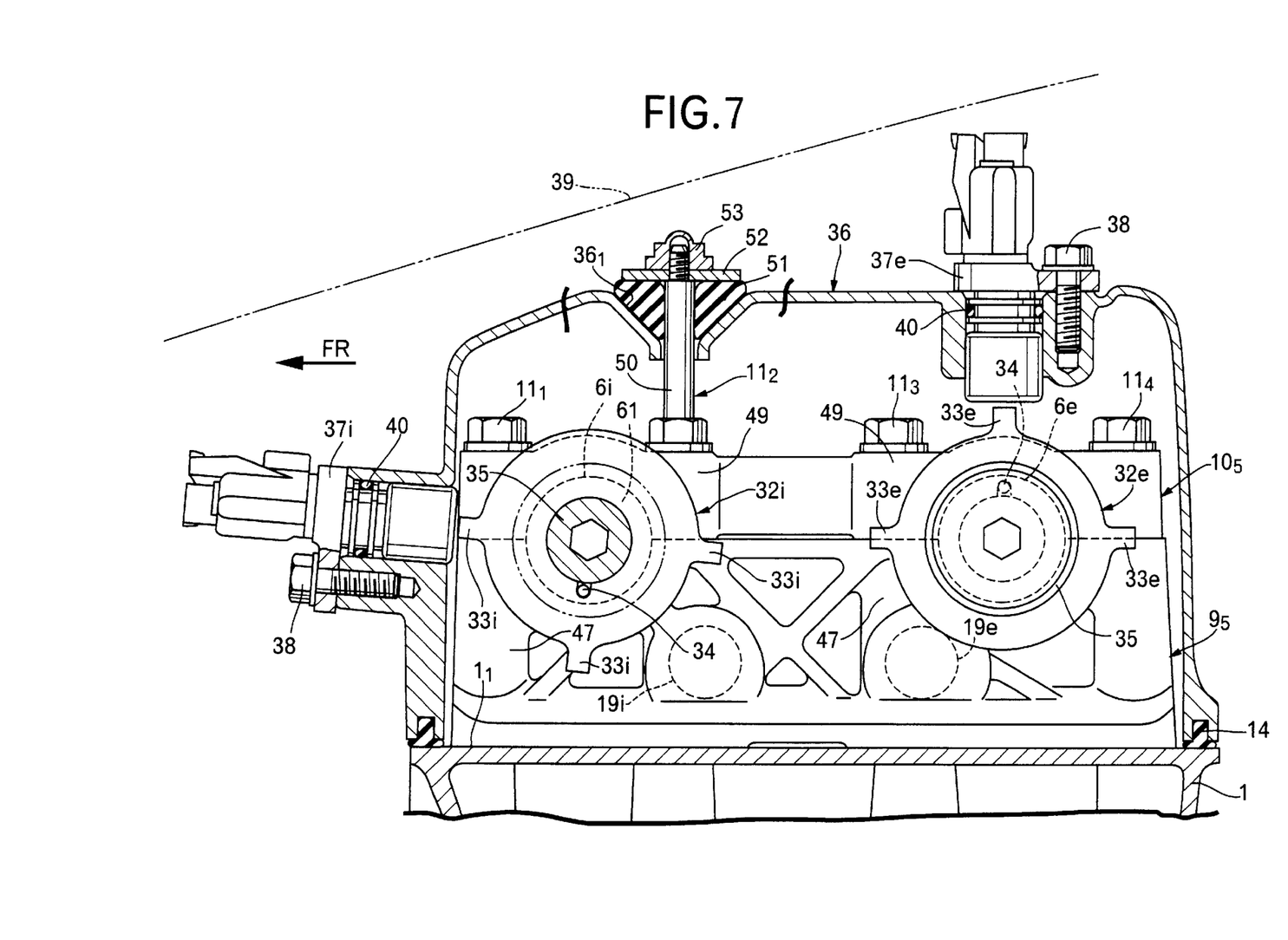
FIG. 7 is a sectional view taken along the line 7—7 of FIG. 4.

As shown in FIGS. 4, 6, and 7, at left axis end portions of the intake camshaft 6$i$ and the exhaust camshaft 6$e$, first thrust control members 31$i$ and 31$e$ and second thrust control members 32$i$ and 32$e$ are located. The first thrust control members 31$i$ and 31$e$ are disc-like members and are integrally formed on the intake camshaft 6$i$ and the exhaust camshaft 6$e$. On the other hand, the second thrust control members 32$i$ and 32$e$ are nearly disc-like members equipped with three projections 33$i$ to be detected and three projections 33$e$ to be detected which are spaced at 90° around the periphery, and are fixed by bolts 35 and 35 in such a state that they are fitted on the step portions $6_1$ and $6_1$ (see FIGS. 6 and 7) of the intake camshaft 6$i$ and the exhaust camshaft 6$e$ and that they are located by locating pins 34 and 34 in the direction of rotation.

To the head cover 36 connected to the upper surface of the cylinder head 1, a TDC (top dead center of a piston) sensor 37$i$ for detecting the three projections 33$i$ to be detected of the second thrust control member 32$i$ on the side of the intake camshaft 6$i$, and a TDC sensor 37$e$ for detecting the three projections 33$e$ to be detected of the second thrust control member 32$e$ on the side of the exhaust camshaft 6$e$ are secured by bolts 38 and 38 respectively. This makes it possible to detect the passing of the three projections 33$i$ to be detected of the second thrust control member 32$i$ and the three projections 33$e$ to be detected of the second thrust control member 32$e$ with both the TDC sensors 37$i$ and 37$e$, and to detect the TDC's of the four cylinders on the basis of the timing thereof. Furthermore, it is preferable to attach O-rings 40 and 40 between the TDC sensors 37$i$ and 37$e$ and the head cover 36.

The TDC sensors 37$i$ and 37$e$ can be installed to and removed from the head cover 36 from the outside by handling the bolts 38 and 38 in a condition where the head cover 36 is left attached to the cylinder head 1.

It is clear from FIG. 7 that a bonnet 39 covering the upper portion of the engine E is inclined to descend forward such that the front side (intake side) is low and the rear side (exhaust side) is high. The TDC sensor 37$i$ on the side of the intake camshaft 6$i$ is substantially horizontally supported at the front surface of the head cover 36 and the TDC sensor 37$e$ on the side of the exhaust camshaft 6$e$ is substantially vertically supported at the upper surface of the rear portion of the head cover 36, so that while minimizing clearance between the head cover 36 and the bonnet 39, occurrence of interference between the TDC sensors 37$i$ and 37$e$ and the bonnet 39 can be avoided, and the position of the bonnet 39 can be lowered.

It is clear from FIG. 6 that on the inner side surfaces (right side surfaces in FIG. 6) of the #5 lower camshaft holder $9_5$ and the upper camshaft holder $10_5$ connected thereto, first thrust load support surfaces 46, 46 and 48, 48 are formed in such a way as to surround the periphery of the intake camshaft 6$i$ and the exhaust camshaft 6$e$, and the first thrust control members 31$i$ and 31$e$ come into slidable contact with the first thrust load support surfaces 46, 46 and 48, 48. Furthermore, on the outer side surfaces (left side surfaces in FIG. 6) of the #5 lower camshaft holder $9_5$ and the upper camshaft holder $10_5$ connected thereto, second thrust load support surfaces 47, 47 and 49, 49 are formed in such a way as to surround the periphery of the intake camshaft 6$i$ and the exhaust camshaft 6$e$, and the second thrust control members 32$i$ and 32$e$ come into slidable contact with the second thrust load support surfaces 47, 47 and 49, 49.

Consequently, when the intake camshaft 6$i$ and the exhaust camshaft 6$e$ receive thrust loads caused by the engagement between the driving helical gear 8 and the driven helical gears 7$i$ and 7$e$, the thrust load is held to restrict the movements of both the camshafts 6$i$ and 6$e$ in the axial directions, by the contact of the first thrust control members 31$i$ and 31$e$ with the first thrust load support surfaces 46, 46 and 48, 48 (see FIG. 5) formed on the inner side surfaces (right side surfaces in FIG. 6) of the #5 lower camshaft holder $9_5$ and the #5 upper camshaft holder $10_5$, or by the contact of the second thrust control members 32$i$ and 32$e$ with the second thrust load support surfaces 47, 47 and 49, 49 (see FIG. 7) formed on the cuter side surfaces (left side surfaces in FIG. 6) of the #5 lower camshaft holder $9_5$ and the #5 upper camshaft holder $10_5$.

Then, since the projections 33$i$ and 33$e$ to be detected by the TDC sensors 37$i$ and 37$e$ are formed around the periphery of the second thrust control members 32$i$ and 32$e$, it becomes unnecessary to provide a special rotation plate with a projection to be detected, and the number of parts is reduced. Furthermore, since the projections 33$i$ and 33$e$ to be detected are located on the second thrust control members 32$i$ and 32$e$ restricting the movements of both the camshafts 6$i$ and 6$e$ in the axial directions, it is possible to minimize the positional fluctuations of the projections 33$i$ and 33$e$ to be detected in the axial directions influenced by thermal expansion or the like of both the camshafts 6$i$ and 6$e$, and to prevent the detecting accuracy of the TDC sensors 37$i$ and 37$e$ from decreasing. Moreover, since the thrust load support surfaces 46, 46 and 47, 47 are formed in positions adjacent to the camshaft support portions 41 and 41 of the #5 lower camshaft holder $9_5$, the fluctuations in rotation of the projections 33$i$ and 33$e$ to be detected can be prevented more effectively so as to increase the detecting accuracy of the TDC sensors 37$i$ and 37$e$.

As shown in FIGS. 5 to 7, in order to prevent occurrence of noise during operation of the engine E, the head cover 36 is supported in a floating state through an elastic member 14 in contact with the head cover connecting surface $1_1$ of the cylinder head 1. Thus, if the head cover 36 is supported in such a way as to float on the cylinder head 1, the positions of the TDC sensors 37$i$ and 37$e$ supported by the head cover 36 are not fixed, and the positions of the second thrust control members 32$i$ and 32$e$ relative to the projections 33$i$ and 33$e$ to be detected may change, and the detecting accuracy may decrease. Accordingly, in the present embodiment, it is thought out to locate the head cover 36 by using the five bolts $11_2$, $11_8$, $11_9$, $11_{16}$, and $11_{18}$ (see FIG. 3) among said twenty bolts $11_1$ to $11_{20}$ connecting the upper camshaft holders $10_1$ to $10_5$ to the lower camshaft holders $9_1$ to $9_5$.

Figure 8:
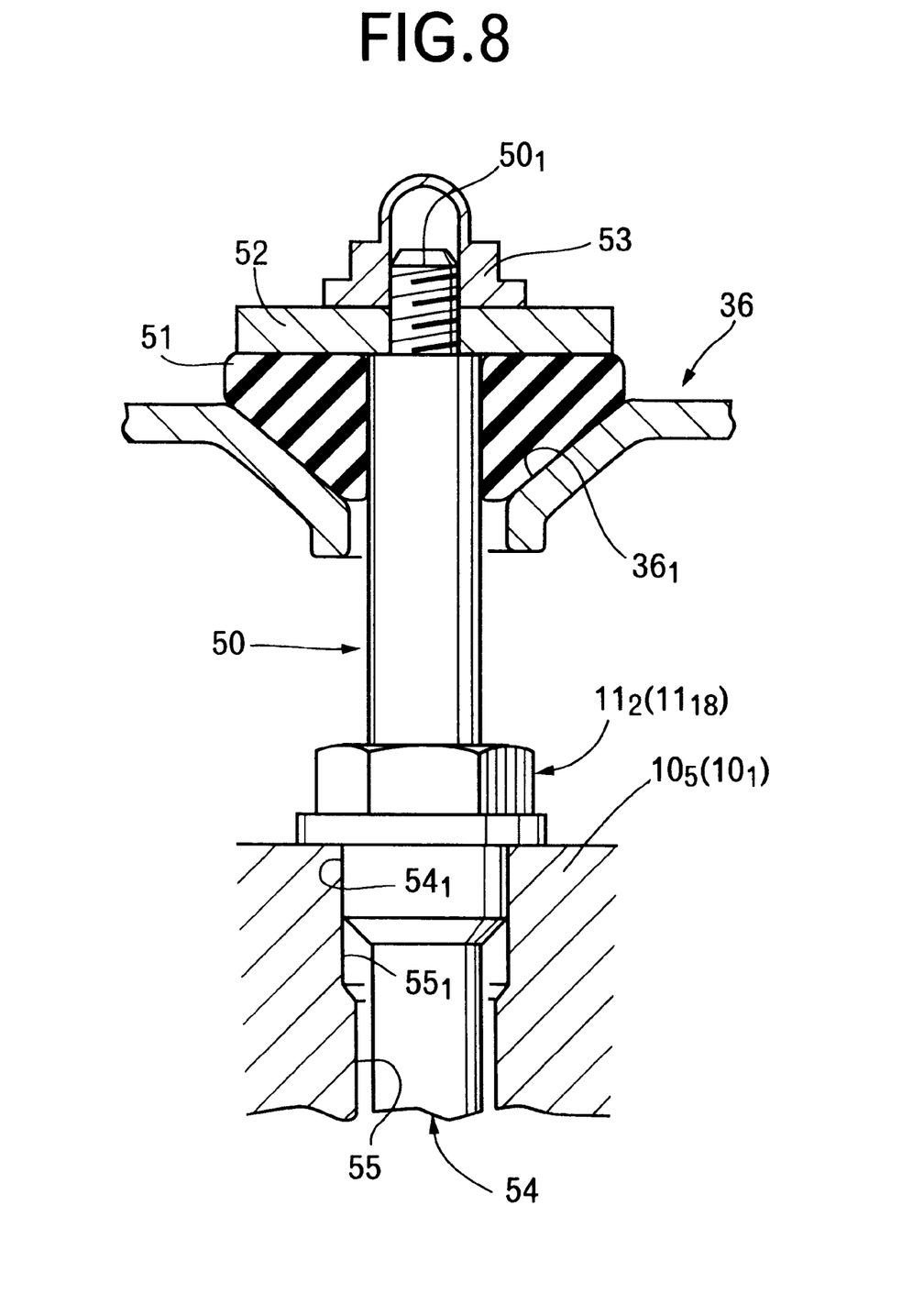
FIG. 8 is an enlarged sectional view taken along the line 8—8 of FIG. 4.

FIG. 8 shows a securing structure of the head cover 36 by the use of the bolt $11_2$, and a structure by the use of one other bolt $11_{18}$ is the same. An extending axial portion 50 extending upward from the bolt $11_2$ penetrates through the center of a truncated cone-like concave portion $36_1$ formed in the head cover 36 with clearance around the periphery, and a nut 53 is screwed onto a male thread portion $50_1$ in such a state that a rubber bush 51 and a washer 52 are fitted on the upper end thereof. The rubber bush 51 has a downward tapered truncated cone-like shape, and the tapered surface is closely joined to said concave portion $36_1$, and they are pressed against each other by the fastening force of the nut 53. Furthermore, at the top of an axial portion 54 of the bolt $11_2$, a positioning portion $54_1$ with a circular cross section processed by precision machining is formed, and the positioning surface $54_1$ is fitted without clearance in a positioning portion $55_1$ with a circular cross section processed by precision machining at the top of a bolt hole 55.

Figure 9:
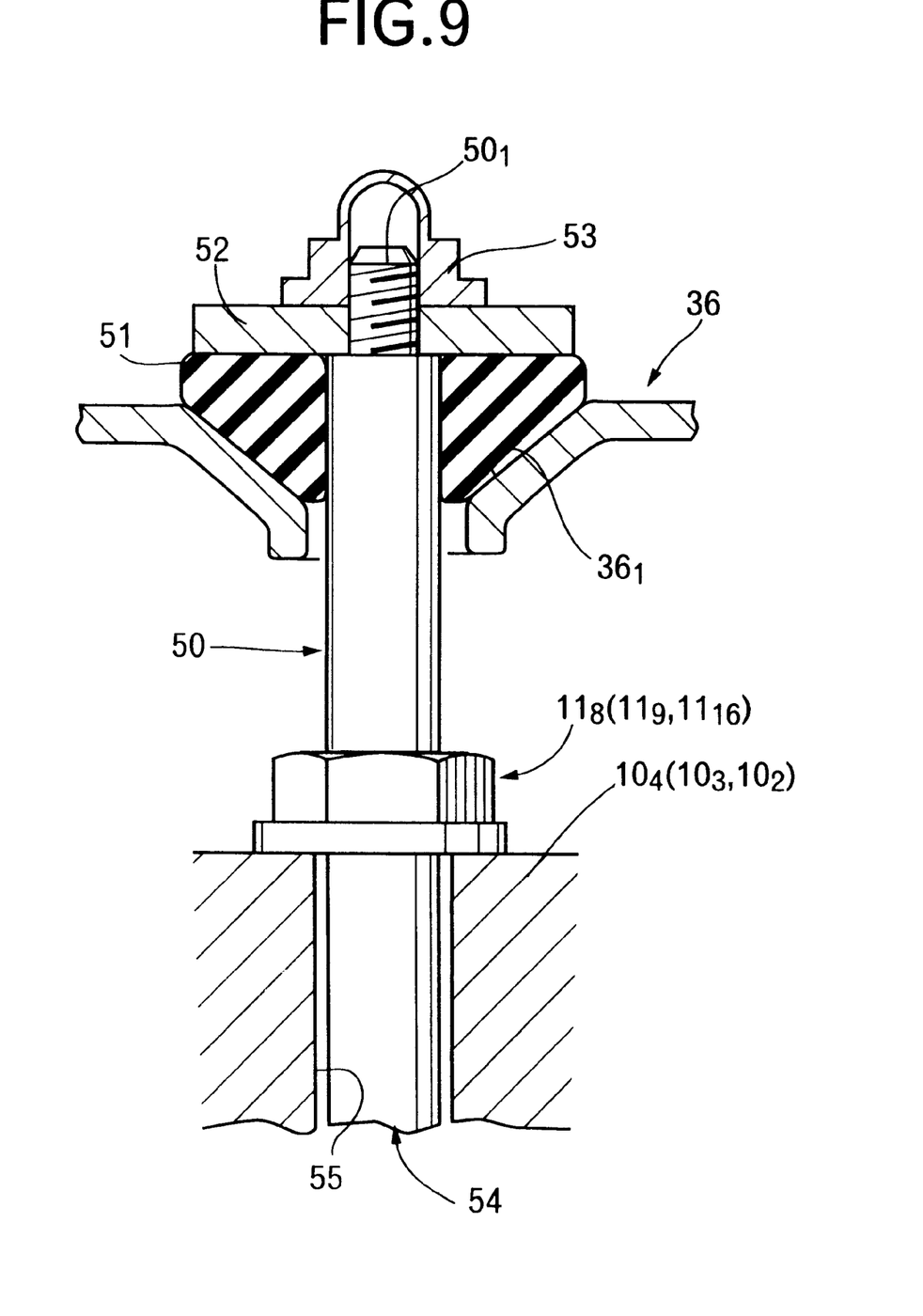
FIG. 9 is an enlarged sectional view taken along the line 9—9 of FIG. 4.

FIG. 9 shows a securing structure of the head cover 36 by the use of the bolt $11_8$, and structures by the use of two other bolts $11_9$ and $11_{16}$ are the same. It is clear by comparing FIG. 8 and FIG. 9 that the securing structure of the head cover 36 by the use of the bolt $11_8$ is the same as the securing structure of the head cover 36 by the use of said bolt $11_2$ except that it has no positioning structure by the use of the positioning surfaces $54_1$ and $55_1$.

Thus, when fastening the head cover 36 to the cylinder head 1 with the bolts $11_2$, $11_8$, $11_9$, $11_{16}$, and $11_{18}$, the rubber bushes 51 are made to intervene, so that the noise can be reduced by shutting off the transfer of vibration to the head cover 36, of course, and positional deviations of the head cover 36 can be prevented by such an aligning function that the tapered surfaces of the rubber bushes 51 are closely joined to the tapered surfaces of the concave portions $36_1$. Then, since the two bolts $11_2$ and $11_{18}$ at both ends are precisely positioned by the function of the positioning surfaces $54_1$ and $55_1$, the accuracy of the position of the head cover 36 relative to the position of the cylinder head 1 can be still further increased.

Consequently, while decreasing the noise by supporting the head cover 36 in a floating state, the accuracy of the relative position between the TDC sensors 37i and 37e supported by the head cover 36 and the projections 33i and 33e to be detected of the second thrust control members 32i and 32e, can be ensured so as to prevent the detecting accuracy from decreasing.

Moreover, it is clear from FIG. 7 that since the TDC sensors 37i and 37e are directly attached from the outside to the head cover 36 located at the uppermost portion of the engine E, not only can they easily be installed and removed only by loosening the bolts 38 and 38 without removing the head cover 36 from the cylinder head 1, but also the accessibility of the sensors to workers is increased. Thus, the installing or removing operation is performed in an easier attitude so that the maintainability of the sensors is largely improved. In addition, since the TDC sensors 37i and 37e are directly attached to the head cover 36 without using mounting brackets or the like, increase in the number of parts, increase in cost, and decrease in the accuracy of the installation position are not caused. Furthermore, the connecting surface between the cylinder head 1 and the head cover 36 is arranged in a position lower than the camshafts 6i and 6e, so that when attaching the TDC sensor 37i to a portion of the head cover 36 beside the camshaft 6i, that is, to a position above said connecting surface, not only the mounting position thereof can easily be ensured, but also the mounting structure can be made simple.

Still further, it is clear from FIG. 1 that the engine E is mounted in such a way that the cylinder block 2 and the cylinder head 1 are slightly inclined backward relative to the vertical direction, and the bonnet 39 is inclined in such a way that the front side of the body is lower. Accordingly, the TDC sensor 37i mounted on the front surface of the head cover 36 and the TDC sensor 37e mounted on the upper surface of the rear portion of the head cover 36 do not easily interfere with the under surface of the bonnet 39, so that the position of the bonnet 39 can be lowered. Moreover, since the TDC sensors 37i and 37e are located at high positions in the engine room, not only are the sensors shielded from contact with water, mud, dust and the like, but also the TDC sensors 37i and 37e do not easily receive an adverse thermal effect of the cylinder head 1, so as to improve durability thereof.

Moreover, since the TDC sensor 37i on the front side is arranged nearer to the cylinder head 1 than the TDC sensor 37e on the rear side, it receives the thermal effect more easily. However, the intake manifold 12 whose temperature is lower than the temperature of the exhaust manifold 13 is arranged on the front side of the cylinder head 1, and furthermore, a wind or air flow caused by traveling movement of the vehicle is easily received by the sensor 37i, so that the thermal effect can be relieved.

Figure 10:
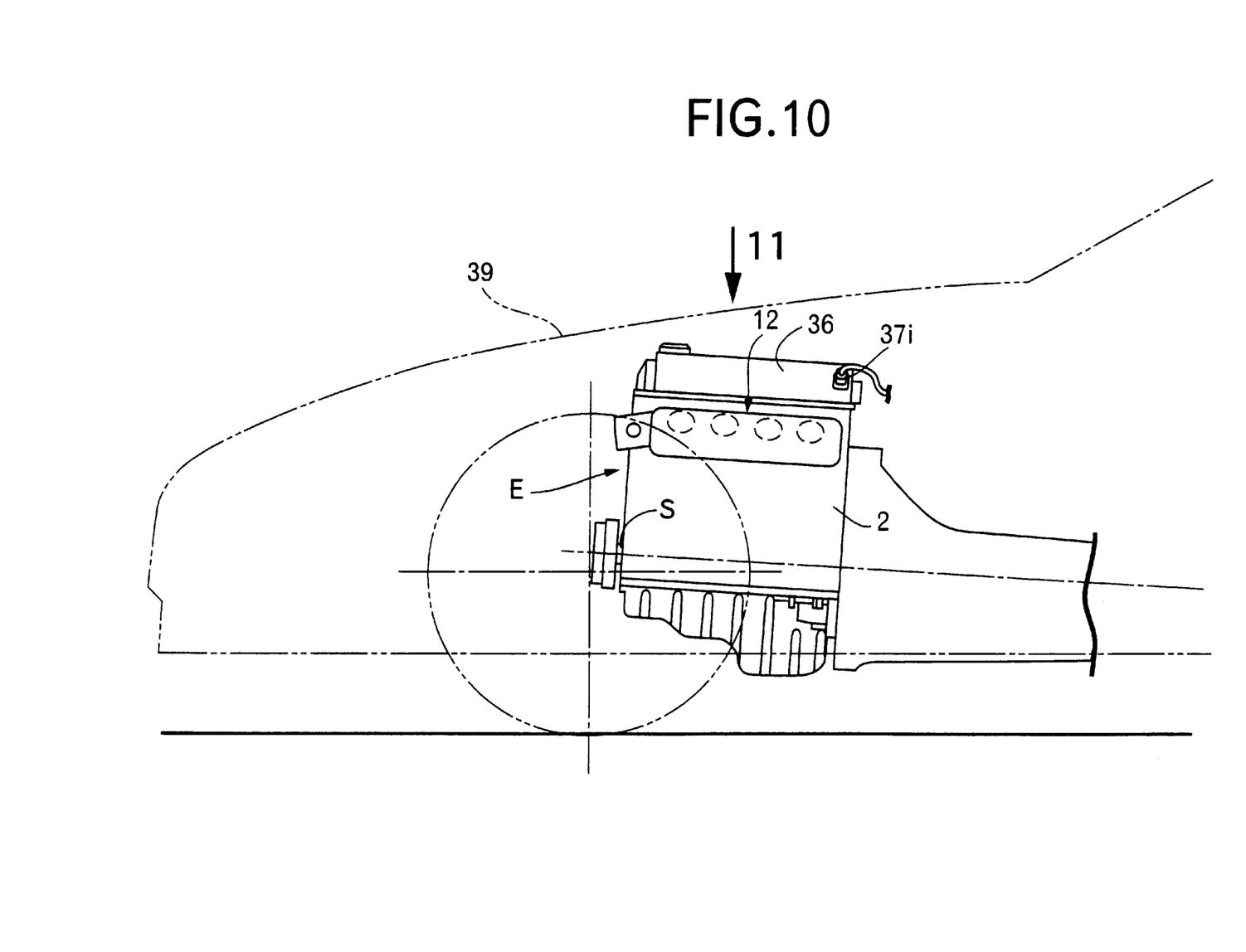
FIG. 10 is a side view of a front portion of a body of a vehicle according to the second embodiment.
Figure 11:
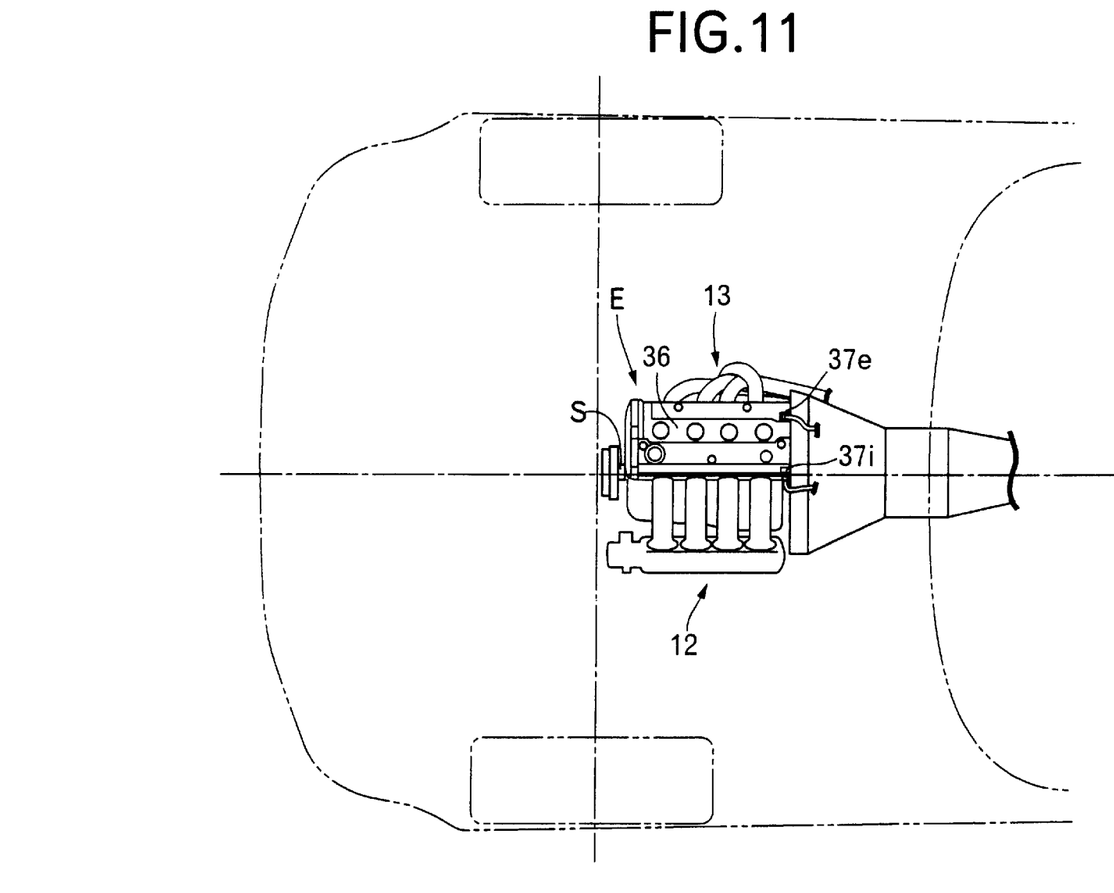
FIG. 11 is a plan view seen in the direction 11—11 shown by the arrow of FIG. 10.

The description of a second preferred embodiment of the present invention will now be given below with reference to FIGS. 10 and 11.

In the second embodiment, the present invention is applied to an engine E of a front-engine rear-drive vehicle, and a straight 4-cylinder engine E mounted on the front portion of the body is substantially the same as the engine of the first embodiment. However, the crankshaft S faces in the back and forth direction of the body, and the cylinder head 1 and the cylinder block 2 are arranged to be slightly inclined toward the right side of the body. Accordingly, the TDC sensors 37i and 37e arranged at the end portion, on the left side of the body, of the head cover 36 in the first embodiment, are arranged at the end portion, on the rear side of the body, of the head cover 36 in the second embodiment.

The bonnet 39 is inclined to descend forward and the axis of the crankshaft S of the engine E is inclined to descend backward, so that a sufficient space is ensured between the rear portion of the head cover 36 to which the TDC sensors 37i and 37e are attached and the under surface of the bonnet 39. Consequently, the TDC sensors 37i and 37e can be arranged by using said space without especially raising the position of the bonnet 39. Furthermore, since the TDC sensor 37e on the right side of the body is mounted not on the side surface of the head cover 36 but on the upper surface thereof, it might normally interfere with the bonnet 39, but the space between said TDC sensor 37e mounted on the right side of the upper surface of the head cover 36 and the bonnet 39, is ensured because the engine E is arranged in such way that the cylinder head 1 and the cylinder block 2 are inclined to the right side of the body.

As above, the preferred embodiments of the present invention were described in detail, but in the present invention, various modifications can be made in a range without departing from the essential points thereof.

For example, in the embodiments, the TDC sensors 37i and 37e are attached to the head cover 36, but they can be attached to other cover members such as a timing chain cover. Furthermore, the rotation detecting device of an engine according to the invention is not limited to a device for detecting the rotational position (phase) of the camshafts 6i and 6e described in the embodiments, but it can be applied for use in detecting the rotational position, the rotational angle, and the number of revolutions, of the camshafts 6i and 6e and other rotational axes (such as a crankshaft) of an engine.

We claim:

1. A rotation detecting device of an engine comprising a portion to be detected located on a rotary shaft of the engine, and a sensor for detecting a position of the portion to be detected, said sensor being directly attached to an outer surface of a cover member located above a cylinder head of the engine;

the cover member is secured to the cylinder head with a bolt extending through a truncated cone-like elastic body located in and received by a tapered surface of a truncated cone-like concave portion formed in the cover member; and said portion to be detected is located on a thrust control member of the camshaft.

2. A rotation detecting device of an engine described in claim 1, wherein the engine includes an intake manifold connected to a front surface of the cylinder head and an exhaust manifold connected to a rear surface of the cylinder head, and said sensor is attached to a front side portion of said outer surface of the cover member covering said cylinder head from above.

3. A rotation detecting device of an engine described in claim 1, wherein the engine includes an intake manifold connected to one side surface of the cylinder head and an exhaust manifold connected to another side surface of the cylinder head, and said sensor is attached to a side portion of said outer surface, on the one side of said intake manifold, of the cover member covering said cylinder head from above.

4. A rotation detection device of an engine mounted on a body of a vehicle and including a first camshaft, a crankshaft, a cylinder head, a head cover, and intake and exhaust manifolds, the rotation detection device comprising a first portion to be detected located on the camshaft, and a first sensor for detecting a position of the first portion to be detected, wherein said engine is arranged under a bonnet of the vehicle body inclined in such a way that a front side of the bonnet is lower than a rear side thereof, the crankshaft faces in a lateral direction of the body, the intake manifold is connected to a front surface of the cylinder head, the exhaust manifold is connected to a rear surface of the cylinder head, and said first sensor is attached to a front side portion of said outer surface of the head cover covering said cylinder head from above;

said engine including a second camshaft, and the engine rotation detection device further includes a second portion to be detected located on said second camshaft, and a second sensor attached to a rear portion of an upper surface of the head cover for detecting a position of said second portion to be detected.

5. A rotation detecting device of an engine described in claim 4, wherein said engine is a backward inclined engine having a cylinder axis inclined backward.

6. A rotation detecting device of an engine described in claim 4, wherein said sensors are directly attached to said head cover.

7. A rotation detection device of an engine mounted on a body of a vehicle and including a camshaft, a crankshaft, a cylinder head, a head cover, and intake and exhaust manifolds, the rotation detection device comprising a portion to be detected located on the camshaft, and a sensor for detecting a position of the portion to be detected, wherein said engine is arranged under a bonnet of the vehicle body inclined in such a way that a front side of the bonnet is lower than a rear side thereof, the crankshaft faces in a lateral direction of the body, the intake manifold is connected to a front surface of the cylinder head, the exhaust manifold is connected to a rear surface of the cylinder head, and said sensor is attached to a front side portion of said outer surface of the head cover covering said cylinder head from above; and said portion to be detected is located on a thrust control member of the camshaft.

8. A rotation detecting device of an engine described in claim 4, wherein the head cover is secured to the cylinder head with a bolt extending through a truncated cone-like elastic body located in and received by a tapered surface of a truncated cone-like concave portion formed in the head cover.

9. A rotation detecting device of an engine mounted on a body of a vehicle and having a camshaft, a crankshaft, a cylinder head and a head cover covering the cylinder head from above, the rotation detecting device comprising a portion to be detected located on the camshaft, and a sensor for detecting a position of the portion to be detected, wherein said engine is arranged under a bonnet of the vehicle body inclined in such a way that a front side of the bonnet is lower than a rear side thereof, with the crankshaft facing in a back and forth direction of the body, wherein said sensor is attached to a rear, upper portion of an outer surface of the head cover, and said portion to be detected is located on a thrust control member of the camshaft.

10. A rotation detecting device of an engine described in claim 9, wherein an axis of the crankshaft is inclined to descend backward.

11. A rotation detecting device of an engine described in claim 9, wherein said sensor is directly attached to the head cover.

12. A rotation detecting device of an engine described in claim 9, wherein the head cover is secured to the cylinder head with a bolt extending through a truncated cone-like elastic body located in and received by a tapered surface of a truncated cone-like concave portion formed in the head cover.

13. A rotation detecting device of an engine having a camshaft, a cylinder head and a head cover covering the cylinder head from above, the device comprising a portion to be detected located on the camshaft, and a sensor for detecting a position of the portion to be detected, wherein a connecting surface between the cylinder head and the head cover is located in a position lower than said camshaft, and wherein said sensor is attached to a portion of an outer surface of said head cover beside the camshaft and said portion to be detected is located on a thrust control member of the camshaft.

14. A rotation detecting device of an engine described in claim 13, wherein said sensor is directly attached to the head cover.

15. A rotation detecting device of an engine described in claim 13, wherein the head cover is secured to the cylinder head with a bolt extending through a truncated cone-like elastic body located in and received by a tapered surface of a truncated cone-like concave portion formed in the head cover.

16. A rotation detection device of an engine as described in claim 4 wherein said camshafts are an intake camshaft and an exhaust camshaft, and wherein a connecting surface between the cylinder head and the head cover is located in a position lower than said camshafts.

17. A rotation detecting device of an engine described in claim 1, wherein said sensor extends substantially horizontally.

18. A rotation detecting device of an engine described in claim 4, wherein said sensor extends substantially horizontally.

19. A rotation detecting device of an engine described in claim 13, wherein said sensor extends substantially horizontally.

20. A rotation detecting device of an engine described in claim 9, wherein the engine is a straight, multi-cylinder engine and the cylinder head is inclined toward one lateral side of the vehicle body.

* * * * *

UNITED STATES PATENT AND TRADEMARK OFFICE
CERTIFICATE OF CORRECTION

PATENT NO. : 5,987,973
DATED : 23 November 1999
INVENTOR(S) : Noriaki Fujii, Mamoru Kosuge, Taketoshi Satoh It is certified that error appears in the above-identified patent and that said Letters Patent is hereby corrected as shown below:

On the cover page, under "[56] References Cited", further under "FOREIGN PATENT DOCUMENTS", change "6/1987" to --5/1987--; change "8/1987" to --2/1987--.

Column 6, 27th line, change "cuter" to --outer--.

Signed and Sealed this

Twenty-ninth Day of August, 2000

Attest:

Q. TODD DICKINSON

Attesting Officer

Director of Patents and Trademarks